United States Patent
Spadacini

(10) Patent No.: US 11,643,964 B2
(45) Date of Patent: May 9, 2023

(54) ENERGY STORAGE PLANT AND PROCESS

(71) Applicant: ENERGY DOME S.P.A., Milan (IT)

(72) Inventor: Claudio Spadacini, Verbania Suna (IT)

(73) Assignee: ENERGY DOME S.P.A., Milan (IT)

( * ) Notice: Subject to any disclaimer, the term of this patent is extended or adjusted under 35 U.S.C. 154(b) by 0 days.

(21) Appl. No.: 17/431,350

(22) PCT Filed: Dec. 17, 2019

(86) PCT No.: PCT/IB2019/060896
§ 371 (c)(1),
(2) Date: Aug. 16, 2021

(87) PCT Pub. No.: WO2020/039416
PCT Pub. Date: Feb. 27, 2020

(65) Prior Publication Data
US 2022/0145778 A1    May 12, 2022

(30) Foreign Application Priority Data

Feb. 19, 2019  (IT) .......................... 102019000002385

(51) Int. Cl.
*F02C 6/14*       (2006.01)
*F01D 15/10*   (2006.01)
(Continued)

(52) U.S. Cl.
CPC ................ *F02C 6/14* (2013.01); *F01D 15/10* (2013.01); *F01K 3/006* (2013.01); *F01K 3/02* (2013.01);
(Continued)

(58) Field of Classification Search
CPC ...... F02C 6/14; F02C 6/16; F02C 1/10; F02C 1/105; Y02E 60/14; Y02E 60/16; F01K 25/103; F01K 3/00–267
See application file for complete search history.

(56) References Cited

U.S. PATENT DOCUMENTS

2010/0101231 A1    4/2010   Westmeier
2012/0216520 A1*  8/2012   Chen ...................... F01K 3/004
                                                                        60/412
(Continued)

FOREIGN PATENT DOCUMENTS

CN     109681279 A   *  4/2019   .............. F01K 11/02
DE    102011007613 A1 * 10/2012  ............ H02J 15/006
(Continued)

OTHER PUBLICATIONS

International Search Report and Written Opinion dated Apr. 6, 2020 in PCT/IB2019/060896 filed on Dec. 17, 2019.
(Continued)

*Primary Examiner* — Laert Dounis
(74) *Attorney, Agent, or Firm* — Oblon, McClelland, Maier & Neustadt, L.L.P.

(57) ABSTRACT

An energy storage plant includes a casing for the storage of a working fluid other than atmospheric air, in a gaseous phase and in equilibrium of pressure with the atmosphere; a tank for the storage of said working fluid in a liquid or supercritical phase with a temperature close to the critical temperature; wherein said critical temperature is close to the ambient temperature. The plant is configured to carry out a closed thermodynamic cyclic transformation, first in one direction in a charge configuration and then in the opposite direction in a discharge configuration, between said casing and said tank; wherein in the charge configuration the plant stores heat and pressure and in the discharge configuration generates energy.

8 Claims, 9 Drawing Sheets

(51) Int. Cl.
*F01K 3/02* (2006.01)
*F01K 3/18* (2006.01)
*F01K 13/02* (2006.01)
*F01K 25/10* (2006.01)
*F01K 3/00* (2006.01)
*F02C 1/10* (2006.01)
*F01K 9/00* (2006.01)

(52) U.S. Cl.
CPC ............... *F01K 3/18* (2013.01); *F01K 3/185* (2013.01); *F01K 13/02* (2013.01); *F01K 25/10* (2013.01); *F01K 25/103* (2013.01); *F02C 1/10* (2013.01); *F01K 9/00* (2013.01); *F05D 2210/12* (2013.01); *F05D 2210/44* (2013.01); *Y02E 60/14* (2013.01); *Y02E 60/16* (2013.01); *Y02E 70/30* (2013.01)

(56) References Cited

U.S. PATENT DOCUMENTS

| | | | |
|---|---|---|---|
| 2013/0327041 A1* | 12/2013 | Gaertner | F01K 13/02 60/645 |
| 2016/0281545 A1 | 9/2016 | Petrosky | |
| 2018/0179917 A1 | 6/2018 | Apte et al. | |
| 2018/0187628 A1 | 7/2018 | Apte | |
| 2018/0340712 A1 | 11/2018 | Peter et al. | |
| 2019/0234305 A1* | 8/2019 | Ramamurthy | F02C 6/16 |
| 2020/0025042 A1 | 1/2020 | Apte et al. | |
| 2020/0182148 A1* | 6/2020 | Williams | F02C 7/14 |
| 2021/0164404 A1 | 6/2021 | Apte et al. | |

FOREIGN PATENT DOCUMENTS

| | | | | |
|---|---|---|---|---|
| DE | 10 2014101 263 B3 | 7/2015 | | |
| GB | 2484080 A * | 4/2012 | ........... | F01K 25/103 |
| GB | 2537126 A * | 10/2016 | ................ | F02C 6/14 |
| GB | 2537126 A | 10/2016 | | |
| WO | WO 2008/108435 A1 | 9/2008 | | |
| WO | WO 2009/113954 A1 | 9/2009 | | |
| WO | WO-2014206708 A1 * | 12/2014 | ................ | F01K 5/02 |
| WO | WO-2018218617 A1 * | 12/2018 | ................ | F02C 6/00 |

OTHER PUBLICATIONS

International Search Report and Written Opinion dated Jul. 8, 2021 in PCT/IB2021/051234 filed on Feb. 15, 2021.

* cited by examiner

ENERGY STORAGE PLANT AND PROCESS

FIELD OF THE INVENTION

Object of the present invention is a plant and a process for the storage of electrical energy. More precisely, object of the present invention is a system able to absorb/use electrical energy from a network or a system when an excess of availability and/or scarcity of consumption is manifested, able to maintain in the time the stored energy and able to transform it back into electrical energy and to put it back in the network when said electrical energy is demanded. In details, this invention is related to a system of storage of electrical energy in the form of potential energy (pressure) and thermal/thermodynamic energy. The present invention is part of medium and large scale energy storage systems, for both terrestrial and marine applications, typically with powers from hundreds of kW up to tens of MW (e.g. 20-25 MW), but also hundreds of MW, and with storage capacity from a few hundred kWh, up to hundreds of MWh and even up to several GWh. The present invention can also be placed in the field of small-scale energy storage systems, for domestic and commercial applications, both terrestrial and marine, typically with powers from a few kW up to a few hundred kW and with storage capacity from a few kWh, up to hundreds of kWh.

DEFINITIONS

The following definitions will be used in the present description and in the accompanying claims.
  Thermodynamic cycle (CT): thermodynamic transformation from a point X to a point Y, where X coincides with Y; the CT, unlike the TTC (Thermodynamic Cyclic Transformation) below, has no mass accumulations (significant for energy purposes) within the cycle, while the TTC typically works between two storages of working fluid, one initial and the other final;
  Thermodynamic Cyclic Transformation (TTC): thermodynamic transformation from a point X to a point Y and from a point Y to a point X, without necessarily passing through the same intermediate points;
  Closed CT and/or TTC: with no mass exchange (significant for energy purposes) with the atmosphere;
  Open CT and/or TTC: with mass exchange (significant for energy purposes) with the atmosphere.

BACKGROUND OF THE INVENTION

Recently, due to the ever-increasing diffusion of systems for the production of energy from renewable sources and in particular from wind and photovoltaic sources, which are characterized by production variability and unpredictability, electric energy storage systems are becoming increasingly important.

The electrical energy storage systems may perform various fundamental functions for the networks, both isolated and interconnected, including the adjustment of frequency/supply of dynamic inertia, the supply of "flexible ramping" systems, i.e. allowing the start of emergency production systems, "energy shifting" from hours of greater production and less demand to hours which, on the other hand, present greater demand and/or lack of production, seasonal compensations, etc.

In addition to systems that operate according to electro-chemical principles (Batteries) that typically have high costs and limited useful life, mechanical (flywheel) suitable only for small amounts of stored energy, the systems currently in use or under development or otherwise known include the following.

The systems mainly in use are the hydroelectric pumping storage systems (PUMPED HYDRO STORAGE—PHS), which currently cover more than 90% of the globally installed storage capacity. These systems are suitable for both long and short term storage, are quite competitive in terms of costs, but have the disadvantage of being able to be built only in places that have particular geo-morphological conditions. Said PHS system can be counted among the energy storage systems in potential form and in particular gravitational. Also the system disclosed in document GB 2518125 A is in the family of gravitational systems.

A second system in use is the so-called CAES system (Compressed Air Energy Storage), which consists of an Open TTC that accumulates through transformation into potential energy (pressure) and (possibly) thermal energy. This CAES system is known both in the basic (non-adiabatic) configuration and in the more advanced AA-CAES (Advanced Adiabatic CAES; see U.S. Pat. No. 4,147,205—Compressed Air Storage Installation) configuration. These systems are suitable for both long and short term storage, are quite competitive in terms of costs, are less efficient than PHS systems in terms of 'Round Trip Efficiency', and they also have the disadvantage of being able to be built only in places with particular geo-morphological conditions.

CAES systems also have an additional disadvantage in that the pressure of the tank/cave varies with the charge level of the same. This affects both the efficiency of the TTC and the efficiency of the turbomachines that perform it.

Systems are also known to remedy the absence of underground caves for CAES systems. In particular, solutions are known that seek to make it economically viable to store energy in over-ground tanks, without the need for underground caves. An example is in US2011/0204064 A1 of LIGHTSAIL where tanks of special construction are proposed in order to try to contain costs of over-ground storage tanks that vice versa would make the costs of said CAES over ground systems unprofitable. These solutions also belong to the systems that work according to an Open TTC.

Systems that combine the two previous systems are also known (see U.S. Pat. No. 7,663,255 B2), in which the combination of CAES and PHS also allows the CAES system to operate at constant compression pressure. These systems too work according to an Open TTC.

The document 'Novel concept of compressed air energy storage and thermos-electric energy storage'—THESE N.5525 (2012)—Ecole Polytechnique Federale de Lousanne, discloses all types of CAES energy storage systems. Among others, the CAES systems diabatic, adiabatic, isothermal and combined with PHS to allow a constant compression pressure, are disclosed, this system is called Constant Pressure-CAES combined with PHS. These too are systems working according to an Open TTC.

The same document also discloses the so-called TEES (Thermo Electric Energy Storage) proposed by ABB Corporate Research Center (see also EP 2532843 A1 and EP 2698506 A1). This is one of the systems that work according to a Closed CT, and can be counted among the PHES systems. PHES systems (pumped heat electrical storage) are systems for storing electrical/mechanical energy by converting it into thermal energy using, for example, Rankine, Brayton or Kalina CT. In addition to the systems described above that use trans-critical and super-critical $CO_2$ cycles or other fluid cycles and therefore reversible trans-super-critical Rankine cycles, PHES systems with Brayton cycle are known, typically using Argon but also air (see Isoentropic EP 2220343 B1 and US 2010/0257862 A1 and Laughlin US 2016/0298455 A1. This is one of the systems that work according to a Closed CT, and can be counted among the PHES systems).

Another system that can be counted among the PHES/TEES systems is the Siemens—Gamesa system (see US 2014/0223910 A1 and U.S. Pat. No. 8,991,183 B2 and U.S. Pat. No. 8,966,902 B2) which combines two different cycles for the charging and discharging phase, and in particular provides for a Brayton cycle or simple dissipation with electrical resistances for the charging phase of the high-temperature heat storage tank and a steam Rankine cycle for the discharge/production phase of electrical energy. This type of solution is one of the PHES systems. It is carried out by means of several Open and/or Closed CT.

It should be noted that all PHES systems, also called TEES, are based on a 'closed' and reversible thermodynamic cycle principle. Depending on the different proposed solutions, they can be 'closed' Rankine or Brayton cycles, but in any case the working fluid of the motor/heat pump, which is almost reversible, performs transformations according to a 'closed' thermodynamic cycle in which there are no intermediate accumulations sized according to the required storage capacity.

All CAES systems, of all types, are instead systems that carry out transformations, first in one direction and then in the other according to an 'open' thermodynamic cycle, that is, taking and returning air to the atmosphere.

Another known method of energy storage is the so-called LAES system (Liquid Air Energy Storage, see US2009/0282840 A1). The LAES method involves transformations according to an 'open' thermodynamic transformation, i.e. taking and returning air to the atmosphere. Moreover, this system works at cryogenic temperatures, close to −200° C., with high technical difficulties. This too belongs to the systems that work according to an Open TTC.

In 'Analysis of the exergy efficiency of a super-critical compressed carbon dioxide energy-storage system based on the orthogonal method' by Qing He, Yinping Hao, Hui Liu, Wenyi Liu, the use of $CO_2$ as working fluid for energy storage systems was also proposed. The proposed system (called SC-CCES (Super Critical—Compressed Carbon dioxide Energy Storage), uses as specified "two saline aquifers as storage reservoirs". In this SC-CCES system, $CO_2$ from the compressor delivery is sent directly to the reservoir without the interposition of any heat exchanger and/or thermal energy storage system. Moreover, during the discharge cycle, the $CO_2$ discharged from the turbine heats up through a recuperator the same $CO_2$ entering the turbine. This solution belongs to systems that work according to a Closed TTC, i.e. between two closed tanks.

Also document 'Green Energy Storage: "The Potential Use of compressed Liquid CO2 and Large Sub-Terrain Cavities to Help Maintain a Constant Electricity Supply"—Dalgaard J Z, talks (both in the title and abstract, and in the body of the document) about the use of $CO_2$ in underground cavities.

SUMMARY

The applicant pointed out that the current electrical energy storage systems do not have characteristics that allow them to be used economically in different situations. In particular, in some cases (e.g. PHS and CAES) the systems require very particular geo-morphological situations that are difficult to find. In some cases (e.g. PHS) the implementation of such systems requires the manufacture of reservoirs with heavy environmental impact.

In other cases (AA-CAES) the realization of thermal energy storage systems presents problems that are difficult to solve at low cost and, moreover, there is still the need to identify suitable underground caves. The above also leads to difficulties in achieving satisfactory Round Trip Efficiency (RTE). In any case, the problem of working with variable pressures in the storage tank remains, unless the CAES system is combined with the PHS system, with obvious additional cost complications and to identify the correct geological conditions.

The applicant further observed that attempts to build surface CAES systems have come up against the practical impossibility of building pressurized air storage tanks at a competitive cost to enable the systems themselves to be built.

The applicant further observed that the attempts to build LAES systems have not at the moment allowed to develop economically viable systems also because of the problems inherent in working in cryogenic conditions. The problems of storing cryogenic energy in double layer tanks with vacuum between layers, and other expensive devices, makes the technology difficult to optimize in terms of costs.

The applicant further observed that the attempts to build PHES systems with almost reversible Rankine cycles present considerable difficulties in achieving satisfactory Round Trip Efficiency (RTE) (i.e. above 60%) and at the same time with reasonable costs, the RTE being linked to temperature differences in the equipment.

Similarly, PHES systems based on the Brayton cycle have to contend with the fact that these systems use a compressor and a turbine for each cycle, both for charging and for discharging. This entails higher investment costs, but also greater irreversibility that can be compensated for obtaining high TENs only by maintaining very high temperature differences between hot and cold storage.

In this context, the Applicant has set itself the objective of designing and implementing an energy storage process and plant, i.e. an energy storage system, that is:
- capable of being done in different geo-morphological situations, which do not require particular geographical or territorial conditions to be realized and that can eventually in certain sizes also be used for marine/offshore applications;
- able to obtain high RTE and in any case higher than 70% and up to 75% and up to even 80% and more;
- capable of working with adjustable storage tank pressures, through various systems described below;
- simple and economical, preferably with the target of having a construction cost of less than 100 USD/kWh and, in particular, that allows storage under pressure and with high energy density (in terms of $m^3_{storage}/kWh_{stored}$);
- able to increase its RTE by using the variations of Ambient Temperature;
- safe and environmentally friendly, e.g. that it does not use particularly hazardous fluids;
- modular;
- compact;
- lasting or having an increased useful life of 30 years;
- flexible and able to get into operation quickly;
- easily and economically maintainable;
- corrosion resistant (especially for marine applications);
- having low levels of vibrations and noise.

The applicant has found that the above objectives and others can be achieved through an Energy Storage system operating by means of thermodynamic cyclic transformations (TTC), first in one direction and then in the opposite direction, between two accumulations of a working fluid in two distinct tanks, one of which (the one with the lowest pressure) is atmospheric, but which is not atmospheric air but another gas in pressure equilibrium with the atmosphere. This system is also characterized by the fact that it stores energy transforming the working fluid from an initial gaseous/steam state to a final liquid or supercritical state with a temperature close to critical temperature (for example less than 1.2 times the critical temperature in Kelvin, preferably between 0.5 and 1.2 times). It is also characterized by the fact that this critical temperature is preferably not far from ambient temperature, preferably close to ambient temperature (preferably between 0° C. and 200° C., more preferably between 0° and 100° C.).

The working fluid is preferably carbon dioxide ($CO_2$), but in order to improve the performance of the system, also in relation to the particular environmental conditions in which it operates, a mixture of $CO_2$ and other substances could be used in order to correct the critical temperature $T_c$ of the fluid. Other fluids, such as $SF_6$, $N_2O$, etc. can be used, always pure or mixed with others.

In the system proposed in this invention, a storage of heat recovered from the delivery of a compressor is present. Both high and low pressure tanks work at constant pressures or in any case adjusted within certain well-defined "ranges", both when the system operates in subcritical and supercritical conditions, possibly with different control strategies.

In particular, the stated objectives and others are substantially achieved by a plant and a process for energy storage of the type claimed in the attached claims and/or described in the following aspects.

In an independent aspect, the present invention concerns an energy storage plant (energy storage system).

Preferably, the plant comprises:
a casing for the storage of a working fluid other than atmospheric air, in a gaseous phase and in equilibrium of pressure with the atmosphere;
a tank for the storage of said working fluid in liquid or supercritical phase with a temperature close to the critical temperature (for example less than 1.2 times the critical temperature in Kelvin 0.5-1.2); wherein said critical temperature is between 0° C. and 200° C., more preferably between 0° C. and 100° C., preferably close to the ambient temperature;
wherein the plant is configured to carry out a closed cyclic thermodynamic transformation (TTC), first in one direction into a charge configuration/phase and then in the opposite direction into a discharge configuration/phase, between said casing and said tank; wherein in the charge configuration the system accumulates heat and pressure and in the discharge configuration it generates energy.

Preferably, the working fluid has the following chemical-physical properties: critical temperature between 0° C. and 100° C., density at 25° C. between 0.5 and 10 $Kg/m^3$, preferably between 1 and 2 $Kg/m^3$.

Preferably, the working fluid is chosen in the group including: $CO_2$, $SF_6$, $N_2O$, or a mixture of the same, or even a mixture of the same with other components that act as additives, for example mainly to modify the parameters of critical Temperature of the resulting mixture in order to optimize the performance of the system.

Preferably, the energy storage plant comprises:
a compressor and a motor mechanically connected to each other;
a turbine and a generator mechanically connected to each other;
said casing externally in contact with the atmosphere and delimiting inside a volume configured to contain the working fluid at atmospheric pressure or substantially atmospheric pressure, wherein said volume is selectively in communication with an inlet of the compressor or with an outlet of the turbine;
a primary heat exchanger (or even a plurality of primary heat exchangers that may also operate with different fluids on their secondary side) selectively in fluid communication with an outlet of the compressor or with an inlet of the turbine;
said tank in fluid communication with the primary heat exchanger to accumulate the working fluid;
a secondary heat exchanger operationally active between the primary heat exchanger and the tank or in the tank.

This plant is configured to operate in a charge or in a discharge configuration.

In the charge configuration, the casing is in fluid communication with the inlet of the compressor and the primary heat exchanger is in fluid communication with the outlet of the compressor, the turbine is at rest, the motor is operating and drives the compressor to compress the working fluid coming from the casing, the primary heat exchanger works as a cooler to remove heat from the compressed working fluid, cool it and store thermal energy, the secondary heat exchanger works as a cooler to remove additional heat from the compressed working fluid and store additional thermal energy, the tank receives and stores the compressed and cooled working fluid, wherein the working fluid stored in the tank has a temperature close to its own critical temperature (e.g. between 0.5 and 1.2 of the critical Temperature in Kelvin). In the discharge configuration, the casing is in fluid communication with the outlet of the turbine and the primary heat exchanger is in fluid communication with the inlet of the turbine, the compressor is at rest, the secondary heat exchanger works as a heater to release heat to the working fluid coming from the tank, the primary heat exchanger works as a heater to release further heat to the working fluid and heat it, the turbine is rotated by the heated working fluid and drives the generator generating energy, the working fluid returns in the casing to atmospheric pressure or substantially atmospheric.

In an independent aspect, the present invention relates to an energy storage process, optionally implemented with the plant according to the previous aspect or according to at least one of the following aspects.

Preferably, the process comprises: carrying out a closed thermodynamic cyclic transformation (TTC), first in one direction in a charge configuration/phase and then in an opposite direction in a discharge configuration/phase, between a casing for the storage of a working fluid other than atmospheric air, in a gaseous phase and in equilibrium of pressure with the atmosphere, and a tank for the storage of said working fluid in a liquid or super-critical phase with a temperature close to the critical temperature (for example between 0.5 and 1.2 of the Critical Temperature in Kelvin);
wherein said critical temperature is close to the ambient temperature, preferably between 0° C. and 100° C., but also up to 200° C.; wherein the process accumulates heat and pressure in the charge phase and generates energy in the discharge phase.

Preferably, said working fluid has the following chemical-physical properties: critical temperature between 0° C. and 200° C., more preferably between 0° C. and 100° C., preferably close to ambient temperature.

Preferably, this working fluid is chosen in the group including: $CO_2$, $SF_6$, $N_2O$, or a mixture of the same, or even a mixture of the same with other components that act as additives, for example mainly to modify the parameters of critical Temperature of the resulting mixture in order to optimize the performance of the system.

Preferably, the process comprises a phase of energy charge and a phase of discharge and generation of energy.

The charge phase comprises:
  compressing the working fluid, coming from said casing externally in contact with the atmosphere and delimiting inside a volume configured to contain said working fluid at atmospheric pressure or substantially atmospheric, absorbing energy;
  injecting the compressed working fluid through a primary heat exchanger (or even a plurality of primary heat exchangers eventually operating with different fluids on their secondary side) and a secondary heat exchanger placed in series to bring a temperature of the working fluid near its own critical temperature; wherein the primary heat exchanger works as a cooler to remove heat from the compressed working fluid, cool it and store thermal energy, wherein the secondary heat exchanger works as a cooler to remove further heat from the compressed working fluid and store further thermal energy;
  accumulating the cooled working fluid in said tank; wherein the secondary heat exchanger and the primary heat exchanger operate a super-critical transformation of the working fluid so that said working fluid is accumulated in the super-critical phase in the tank or wherein the secondary heat exchanger and the primary heat exchanger operate a sub-critical transformation of the working fluid so that said working fluid is accumulated in the liquid phase in the tank (preferably also with the aim of regulating the pressure to a relatively minimum/low value).

The phase of discharge and power generation comprises:
  passing the working fluid, coming from the tank, through the secondary heat exchanger and the primary heat exchanger; wherein the secondary heat exchanger works as a heater to transfer heat to the working fluid coming from the tank (preferably also with the aim of regulating the pressure to a relatively high/maximum value), wherein the primary heat exchanger works as a heater to release additional heat to the working fluid and heat it up;
  passing the heated working fluid through a turbine, wherein the turbine is rotated by the heated working fluid and drives a generator generating energy, wherein the working fluid expands and cools in the turbine;
  re-injecting the working fluid from the turbine into the casing at atmospheric or substantially atmospheric pressure.

The applicant has verified that the process and the apparatus according to the invention allow to achieve the set objectives.

In particular, the applicant has verified that the invention allows the storage of energy in places without particular geo-morphological characteristics, even for marine/off-shore applications, in a safe manner and with a low environmental impact.

The applicant has also verified that the manufacture and subsequent maintenance of an apparatus according to the invention are relatively inexpensive.

The applicant has also verified that the invention enables high RTE to be achieved.

The applicant has also verified that the invention allows to operate an energy storage with the possibility to regulate the pressure in the storage tanks, thus allowing a better operability of the system, a greater efficiency of both the turbomachinery and the system in terms of RTE.

Aspects of the invention are listed below.

In one aspect, the primary heat exchanger is, or is operatively coupled to, a thermal storage (Thermal Energy Storage—TES).

In one aspect, first pipelines develop between the casing and the compressor inlet and between the casing and the turbine outlet to connect the fluid casing with the compressor and turbine.

In one aspect, at least one valve is operationally placed on said first pipelines to connect the fluid alternately with the compressor casing or the turbine with the casing.

In one respect, second pipelines develop between the turbine inlet and the primary heat exchanger and between the compressor outlet and the primary heat exchanger to put in fluid communication said primary heat exchanger with said compressor and turbine.

In one aspect, at least one valve is operationally placed on said second pipelines to put in fluid communication the compressor with the primary heat exchanger or the primary heat exchanger with the turbine.

In one aspect, third pipelines develop between the primary heat exchanger and the secondary heat exchanger to put in fluid communication said primary heat exchanger with said secondary heat exchanger.

In one aspect, an additional heat exchanger is operationally placed between the casing and the compressor and between the casing and the turbine to pre-heat the working fluid before compression in the compressor, in the charge configuration, or to cool the working fluid coming from the turbine, in the discharge configuration.

In one aspect, the additional heat exchanger is operationally associated with the first pipelines.

In one aspect, the additional heat exchanger comprises an additional thermal energy storage device.

In one aspect, in the charge configuration, the additional heat exchanger works as a heater to pre-heat working fluid.

In one aspect, in the discharge configuration, the additional heat exchanger works as a cooler to cool the working fluid and store additional thermal energy that is used in the charge configuration to pre-heat said working fluid.

In one aspect, a cooler is placed on a branch of the first pipelines connected to the outlet of the turbine.

In one aspect, a further heat exchanger operatively associated with an additional heat source is operatively interposed between the turbine and the primary heat exchanger and is configured to further heat the working fluid in the discharge phase before entering the turbine.

In one aspect, in the discharge configuration, the additional heat source provides additional heat to the working fluid.

In one aspect, in the discharge phase and generation of energy, between the primary heat exchanger and the turbine, it is envisaged to further heat the working fluid via an additional heat source.

In one aspect, the additional heat source is: a solar source (e.g. solar field) and/or industrial waste heat recovery (Waste Heat Recovery) and/or exhaust heat from gas turbines (GT).

In one aspect, a temperature at which the working fluid is brought in the discharge phase and just before entering the turbine, via the additional heat source and the further heat exchanger, is greater than a temperature of the working fluid at the end of compression during the charge phase.

In one aspect, the temperature at which the working fluid is brought via the additional heat source and the additional heat exchanger is greater of about 100° C., but also 200° C. or 300° C. or 400° C. compared to the temperature of the working fluid at the end of compression.

The Applicant has verified that the further heating of the working fluid by the additional heat source allows to considerably increase the Round Trip Efficiency (RTE).

In one aspect, the casing is deformable.

In one aspect, the casing has the structure of a gasometer.

In one aspect, the casing is a pressure-balloon.

In one aspect, the casing is made of flexible material, preferably plastic, e.g. PVC coated polyester fabric.

In one aspect, the motor and generator are distinct elements, wherein the motor is preferably permanently connected to the compressor and the generator is preferably permanently connected to the turbine.

In one aspect, the motor and the generator are defined by a single motor-generator. In one aspect, the plant comprises connection devices, preferably of the clutch type, between the motor-generator and the compressor and also between the motor-generator and the turbine to connect mechanically and alternately the motor-generator to the compressor or to the turbine.

In one aspect, the motor-generator, the compressor and the turbine are arranged on a same axis.

In one aspect, the compression of the working fluid in the compressor is adiabatic, inter-cooled or isothermal.

In one aspect, the working fluid expansion in the turbine is adiabatic, inter-heated or isothermal.

In one aspect, an auxiliary thermal storage (Thermal Energy Storage TES) is connected to the compressor and to the turbine.

In one aspect, the auxiliary thermal accumulator is configured to realize, in the compressor and during the charge phase, an inter-cooled compression, with one or more inter-coolings.

In one aspect, the auxiliary thermal accumulator is configured to perform, in the turbine and during the discharge phase, an inter-heated expansion, with one or more inter-heatings.

In one aspect, it is envisaged to perform a plurality of inter-coolings in the charge phase and to perform a smaller number of inter-heatings than the number of inter-coolings using heat (accumulated in the auxiliary thermal accumulator) of only part of the inter-coolings.

In one aspect, it is envisaged to perform a plurality of inter-coolings in the charge phase and to perform a single inter-heating in the discharge phase by using heat (accumulated in the auxiliary thermal accumulator) of the last inter-cooling only.

The Applicant has verified that the combination of the further heating of the working fluid by the additional heat source together with the inter-coolings and the above mentioned inter-heatings allows to increase the Round Trip Efficiency (RTE) up to values greater than 100%.

In one aspect, the primary heat exchanger is or comprises a fixed or moving bed heat regenerator In one aspect, the fixed or moving bed heat regenerator comprises at least one thermal mass lapped by the working fluid.

In one aspect, the fixed or moving bed heat regenerator comprises at least one thermal mass not lapped by the working fluid, but separated from it by a wall, typically made of metal, which is capable of containing the pressure, and therefore the mass is at atmospheric pressure.

In one aspect, the thermal mass comprises incoherent material, optionally gravel or metal or ceramic balls.

In one aspect, the thermal mass comprises coherent material, optionally cement or ceramic or metal.

In one aspect, the primary heat exchanger comprises a primary circuit crossed by a primary fluid or several primary circuits crossed by several primary fluids, optionally water, oil or salts.

In one aspect, the primary circuit comprises a heat exchange portion configured to exchange heat with the working fluid.

In one aspect, the primary circuit comprises at least one primary storage chamber, preferably two storage chambers, for said primary fluid.

In one aspect, the primary circuit comprises a hot primary storage chamber, for the hot primary fluid accumulated after removing heat from the working fluid in the charge configuration/phase of the apparatus/process, and a cold primary storage chamber, for the cold primary fluid accumulated after transferring heat to the working fluid in the discharge configuration/phase of the apparatus/process.

In one aspect, the primary circuit comprises a fixed bed heat regenerator, preferably operating at atmospheric pressure, which is lapped by the primary fluid.

In one aspect, the secondary heat exchanger comprises a secondary circuit crossed by a secondary fluid, optionally air or water.

In one aspect, the secondary circuit comprises a heat exchange portion configured to be lapped by the working fluid.

In one respect, the secondary circuit comprises at least one secondary storage chamber for this secondary fluid.

In one aspect, the secondary circuit comprises a hot secondary storage chamber, for the hot secondary fluid accumulated after removing heat from the working fluid in the charge configuration/phase of the apparatus/process, and a cold secondary storage chamber, for the cold secondary fluid accumulated after releasing heat to the working fluid in the discharge configuration/phase of the apparatus/process.

In one aspect, the secondary heat exchanger is located between the primary heat exchanger and said tank.

In one aspect, the secondary heat exchanger is integrated into the tank.

In one aspect, the secondary heat exchanger is equipped with systems for regulating the flow rate and/or temperature of secondary fluid, typically water or air, capable of regulating the pressure in the storage tanks within certain limits, when the system operates in sub-critical conditions.

Temperature control can be carried out by adding heat from the atmosphere or removing heat to the atmosphere, also taking advantage of the normal fluctuations in ambient temperature of air and water at different times of the day.

In one aspect, the secondary heat exchanger is placed in a basin full of water, consisting of one chamber or two chambers. In said secondary heat exchanger the working fluid is condensed during charge phase and evaporated in discharge phase by circulating water, preferably through immersion pumps. The two chambers of said basin may be covered or uncovered and in communication or not with the environment so that the chamber from which the water is circulated for the condensation in charge phase is always cooled by the surrounding environment, while that from which the water is circulated for evaporation in discharge phase is always heated by the surrounding environment and possibly kept warm by covering.

In one aspect, the above can be further supported by special exchange systems that absorb heat or release heat, in a convective and radiant way with the environment, all for improving the RTE of the system. This way a pressure adjustment when the system is operating under sub-critical conditions is performed.

In one aspect, the heat exchange portion of the secondary heat exchanger is housed inside the tank.

In one aspect, the secondary circuit is configured to remove heat from the working fluid, in the charge configuration, or to transfer heat to the working fluid, in the discharge configuration, at a temperature below 100° C., optionally between 0° C. and 50° C., optionally at a temperature close to the ambient temperature.

In one aspect, in the charge configuration/phase, since the secondary heat exchanger works in conditions close to ambient temperature, due to the fact that the fluid has a critical temperature close to ambient temperature, it is possible that the phase of heat removal through the secondary heat exchanger is assisted by a phase of direct or indirect exchange with the atmosphere.

In one aspect, in the discharge configuration/phase, since the secondary heat exchanger works in conditions close to ambient temperature, due to the fact that the fluid has a critical temperature close to ambient temperature, it is possible that the phase of heat supply through the secondary heat exchanger is assisted by a phase of direct or indirect exchange with the atmosphere.

In one aspect, the tank is spherical or substantially spherical.

In one aspect, the tank is cylindrical or substantially cylindrical.

In one aspect, an outer wall of the tank is made of metal.

In one aspect, a temperature of the working fluid accumulated in the tank is between 0° C. and 100° C.

In one aspect, a pressure the working fluid accumulated in the tank is between 10 bar and 150 bar, preferably between 10 bar and 150 bar, preferably between 50 and 100 bar, preferably between 65 and 85 bar.

In one aspect, a ratio between a density of the working fluid when contained in the tank and a density of the working fluid when contained in the casing is between 200 and 500.

In one aspect, the secondary heat exchanger and the primary heat exchanger are configured to operate a super-critical transformation of the working fluid so that said working fluid is accumulated in the tank in super-critical phase.

In one aspect, it is provided for removing heat from the working fluid in the primary heat exchanger until it is brought, in a T-S diagram, to a temperature above the critical temperature and above the Andrews bell.

In one aspect, it is provided for removing heat from the working fluid in the secondary heat exchanger by bringing it into the super-critical phase and making it follow the right portion of the Andrews bell.

In one aspect, the tank comprises a separation membrane configured to internally separate the tank into a first chamber with variable volume for the working fluid in super-critical phase and a second chamber with variable volume in fluid communication with a compensation circuit containing a non-compressible fluid, optionally water.

In one aspect, the compensation circuit is configured to maintain a substantially constant pressure in the super-critical working fluid contained in the first variable volume chamber of the tank, or at least to maintain the working fluid pressure always above a certain minimum value.

In one aspect, the compensation circuit comprises an auxiliary tank for the non-compressible fluid, optionally at atmospheric pressure, in fluid communication with the second variable volume chamber.

In one aspect, the compensation circuit comprises an auxiliary turbine connected to an auxiliary generator and configured to be rotated by the incompressible fluid coming from the second variable volume chamber in the charge configuration/phase of the apparatus/process.

In one aspect, the expansion energy of the liquid (typically water) of the compensation circuit in charge phase is between $1/100$ and $7/100$ of the charging energy of the storage system through the compressor.

In one aspect, the compensation circuit comprises a pump connected to an auxiliary motor and configured to pump the non-compressible fluid from the auxiliary tank into the second variable-volume chamber in the discharge configuration/phase of the apparatus/process.

In one aspect, the pumping energy of the liquid (typically water) of the compensation circuit in discharge phase is between $1/100$ and $7/100$ of the discharge energy of the storage system through the turbine.

In one aspect, the secondary heat exchanger and the primary heat exchanger are configured to perform a sub-critical transformation of the working fluid so that the working fluid is accumulated in the tank in liquid phase.

In one aspect, it is provided for removing heat from the working fluid in the primary heat exchanger until it is brought to a temperature below the critical temperature in a T-S diagram and to a point on the left portion of the Andrews bell.

In one aspect, it is provided for removing heat from the working fluid in the secondary heat exchanger by passing it through the saturated vapor zone until it reaches the liquid phase.

Further features and advantages will appear in greater detail in the detailed description of preferred, but not exclusive, embodiments of a plant and process for energy storage according to the present invention.

DESCRIPTION OF DRAWINGS

This description will be set out below with reference to the attached drawings, which are provided for indicative and non-limiting purposes, in which.

DETAILED DESCRIPTION

With reference to the attached figures, with the reference number 1, a plant for the storage of energy (energy storage) according to the present invention has been indicated overall.

The plant 1, for example, operates with a working fluid other than atmospheric air. For example, plant 1 operates with a working fluid chosen from the group including: carbon dioxide $CO_2$, sulphur hexafluoride $SF_6$, nitrous oxide $N_2O$. In the following description, the working fluid used in combination with described plant 1 is carbon dioxide $CO_2$.

Plant 1 is configured to perform a closed cyclic thermodynamic transformation (TTC), first in one direction into a charge configuration/phase and then in the opposite direction into a discharge configuration/phase, in which plant 1 stores heat and pressure in the charge configuration and generates electrical energy in the discharge configuration.

Figure 1:
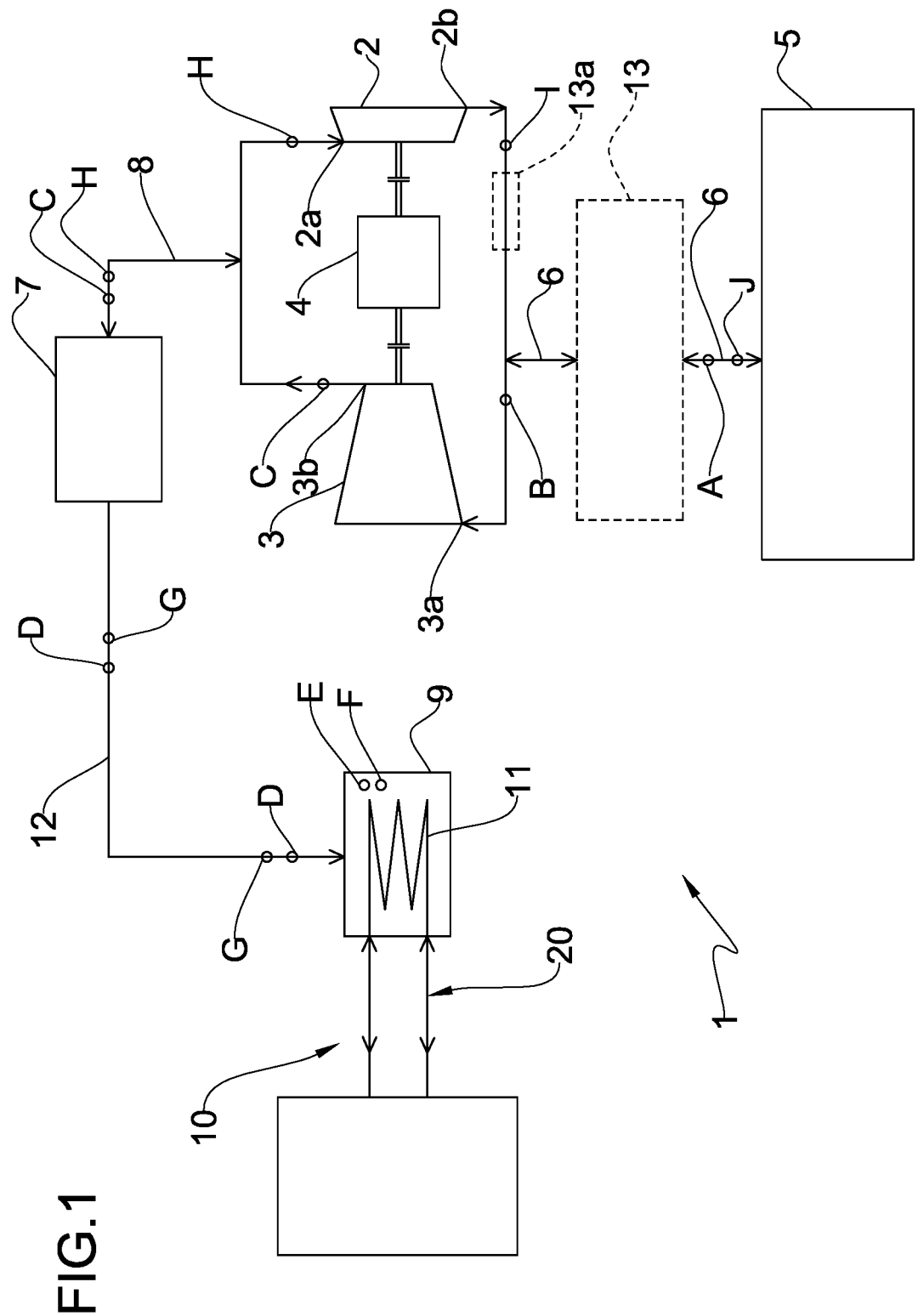
FIG. 1 schematically shows an embodiment of an energy storage plant according to the present invention.

With reference to FIG. 1, plant 1 comprises a turbine 2 and a compressor 3 mechanically connected to a shaft of a single motor-generator 4. The motor-generator 4, the compressor 3 and the turbine 2 are arranged on a same axis. A shaft of the turbine 2 is coupled to one end of the shaft of the motor-generator 4 by means of connection devices, e.g. of the clutch type, which make it possible to connect and disconnect, on command, the turbine 2 to and from the motor-generator 4. Similarly, a shaft of the compressor 3 is coupled to an opposite end of the shaft of the motor-generator 4 by means of connection devices, e.g. of the clutch type, which allow the compressor 3 to be connected to and disconnected, on command, from the motor-generator 4. In other embodiments not shown here, the motor is firmly connected to the compressor 3 and the generator is firmly connected to the turbine 2. In such a case, the motor is permanently connected to compressor 3 and the generator is permanently connected to turbine 2.

Plant 1 comprises a casing 5 preferably defined by a pressure-balloon made of flexible material, e.g. PVC coated polyester fabric. The pressure-balloon is placed on the earth's surface and is externally in contact with atmospheric air. The pressure-balloon delimits inside a volume configured to contain the working fluid at atmospheric pressure or substantially atmospheric pressure, i.e. in equilibrium of pressure with the atmosphere. The casing 5 may also be designed as a gasometer or any other gas storage system with low or no overpressure.

First pipelines 6 develop between the casing 5 and an inlet 3a of the compressor 3 and between the casing 5 and an outlet 2b of the turbine 2 to connect the internal volume of the casing 5 with said compressor 3 and turbine 2. A valve or a valve system, not illustrated, may be operationally placed on the first pipelines 6 to put in fluid communication alternately the casing 5 with the inlet 3a of the compressor 3 or the outlet 2b of the turbine 2 with the casing 5.

The plant 1 comprises a primary heat exchanger 7 which can be selectively put in fluid communication with an outlet 3b of compressor 3 or with an inlet 2a of turbine 2. For this purpose, second pipelines 8 develop between the inlet 2a of the turbine 2 and primary heat exchanger 7 and between the outlet 3b of the compressor 3 and the primary heat exchanger 7. A valve, or a valve system, not illustrated, is operationally located on the second pipelines 8 to connect the primary heat exchanger 7 with the inlet 2a of turbine 2 or the outlet 3b of compressor 3 with the primary heat exchanger 7. In a preferred embodiment, there is only one valve or valve system located on the second pipelines 8.

A tank 9 is in fluid communication with the primary heat exchanger 7 and is configured to store the working fluid in liquid or supercritical phase.

The tank 9 is preferably made of metal with a spherical outer wall.

A secondary heat exchanger 10 is operationally active between the primary heat exchanger 7 and the tank 9, or in said tank 9, and is configured to operate on the working fluid accumulated or in accumulation phase in the tank 9. According to what is shown in the embodiment of FIG. 1, the secondary heat exchanger 10 is integrated in tank 9 in the sense that it has its own heat exchange portion 11 housed inside the tank 9 and configured to be touched by the working fluid contained in said tank 9. Third pipes 12 develop between the primary heat exchanger 7 and the tank 9 to put in fluid communication said primary heat exchanger 7 with said tank 9 and with said secondary heat exchanger 10.

In the schematic representation of FIG. 1, the plant 1 may also comprise an additional heat exchanger 13 operationally placed between the casing 5 and the compressor 2 and between the casing 5 and the turbine 2 and possibly a cooler 13a positioned on a branch of the first pipelines 6 connected to the outlet 2b of turbine 2.

The plant 1 also comprises a control unit, not shown, operationally connected to the different elements of the same plant 1 and configured/programmed to manage its operation.

The plant 1 is configured to operate in a charge configuration or in a discharge configuration or to perform a process comprising a phase of energy charge and a phase of discharge and energy generation.

Figure 3:
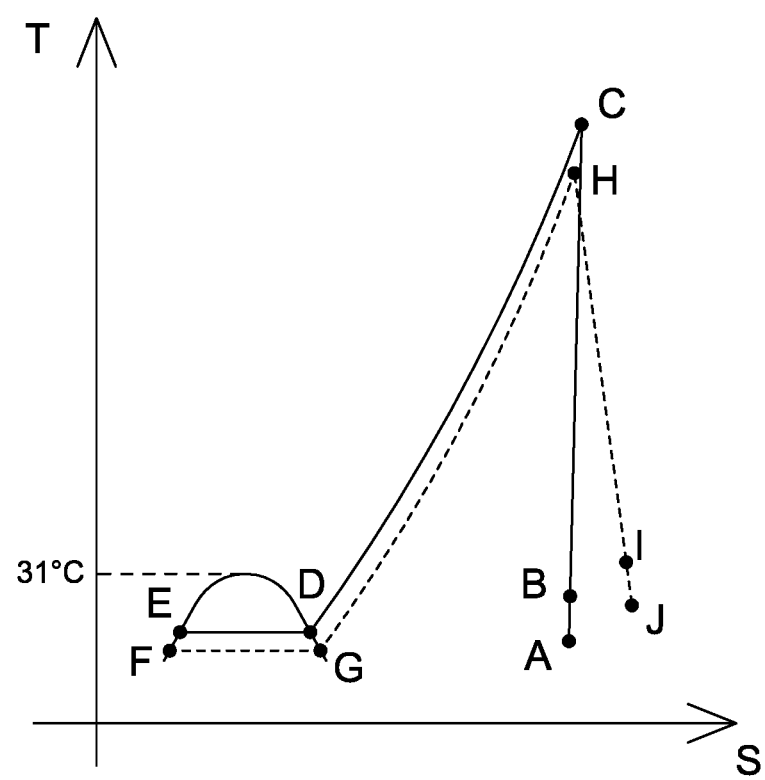
FIG. 3 is a T-S diagram showing a process according to the present invention implemented in the plants of FIG. 1 or 2.

In the charge configuration, the plant 1 starts from a first state in which the working fluid ($CO_2$) in gaseous form is all contained in the casing 5 at atmospheric pressure or substantially atmospheric pressure and at a temperature substantially equal to the ambient temperature (point A of the T-S diagram in FIG. 3). Casing 5, through the valve system, is connected to the inlet 3a of the compressor 3 while communication with the outlet 2b of the turbine 2 is blocked. In addition, by means of the valve system, the primary heat exchanger 7 is in fluid communication with the outlet 3b of the compressor 3 and communication with the inlet 2a of the turbine 2 is blocked. The motor-generator 4 is coupled to the compressor 3 only and is decoupled from the turbine 2 (which is at rest) and works as motor to drive the compressor 3 such as to compress the working fluid coming from the casing 5.

Before entering the compressor 3, the working fluid passes through the additional heat exchanger 13 which acts as a heater to pre-heat the working fluid (point B of the T-S diagram in FIG. 3). The working fluid is then compressed in the compressor 3 and heats up (point C of the T-S diagram in FIG. 3). The working fluid then flows through the primary heat exchanger 7 which works as a cooler to remove heat from the compressed working fluid, cool it (point D of the T-S diagram in FIG. 3) and store the thermal energy removed from the working fluid. At point D the working fluid is at a temperature lower than the critical temperature of the working fluid and at a point on the left side of the Andrews bell or slightly outside the bell in conditions of slight overheating. This compression may be adiabatic, inter-cooled or isothermal.

The working fluid enters the tank 9 where the secondary heat exchanger 10, which in this configuration works as a cooler, removes further heat from the working fluid and accumulates further thermal energy. The working fluid passes through the saturated vapor zone until it reaches the liquid phase (point E of the T-S diagram in FIG. 3). The tank 9 therefore accumulates the working fluid in the liquid phase at a temperature lower than its own critical temperature Tc. In this second state, the working fluid ($CO_2$, Tc=31° C.) in liquid form, for example at 20° C., is all contained in the tank 9. The secondary heat exchanger 10 and the primary heat exchanger 9 are therefore configured to perform a sub-critical transformation of the working fluid so that the working fluid is accumulated in the tank 9 in liquid phase.

In the discharge configuration, the plant 1 starts from the second state (point F of the T-S diagram in FIG. 3). The casing 5, through the valve system, is put in communication with the outlet 2b of turbine 2 while communication with the inlet 3a of the compressor 3 is blocked. In addition, by means of the valve system, the primary heat exchanger 7 is in fluid communication with the inlet 2a of the turbine 2 and the communication with the outlet 3b of the compressor 3 is blocked. The motor-generator 4 is coupled to turbine 2 only and is decoupled from compressor 3 (which is at rest) and works as a generator driven in rotation by the turbine 2 driven by the expanding working fluid.

The secondary heat exchanger 10 works as a heater and transfers some of the heat previously accumulated in the charge configuration to the working fluid in the tank 9. The working fluid passes through the saturated steam zone until it reaches the steam phase (point G of the T-S diagram in FIG. 3). The working fluid passes through the primary heat exchanger 7 which now works as a heater and releases additional heat, previously accumulated in the charge configuration, to the working fluid and heats it (point H of the T-S diagram in FIG. 3).

The heated working fluid enters the turbine 2, expands and cools (point I of the T-S diagram in FIG. 3) and causes the rotation of the turbine 2. The turbine 2, rotated by the heated working fluid, drives the motor-generator 4, which works as a generator and generates electrical energy. The working fluid expansion in the turbine may be adiabatic, inter-heated or isothermal.

The working fluid coming from turbine 2 is cooled in the additional heat exchanger 13 (point J of diagram T-S in FIG. 3) and returns into the casing 5 at atmospheric or substantially atmospheric pressure. The additional heat exchanger 13 in this phase stores additional thermal energy in a respective additional thermal energy storage device, which will be used in the next charge phase to pre-heat the working fluid.

In the transformation illustrated in FIG. 3, the secondary circuit 20 is configured to remove heat from the working fluid, in the charge configuration, or to transfer heat to the working fluid, in the discharge configuration, at a temperature close to the ambient temperature, for example, of about 20° C.

Both in the charge and in the discharge configuration/phase, since the secondary heat exchanger 10 operates in conditions close to the ambient temperature, due to the fact that the fluid has a critical temperature close to the ambient temperature, it is possible that the heat removal phase and/or the heat supply phase by the secondary heat exchanger is/are assisted by a phase of direct or indirect exchange with the atmosphere.

For example, a working fluid temperature ($CO_2$) accumulated in the tank 9 is 24° C. and a working fluid pressure accumulated in the tank 9 is 65 bar. The density of $CO_2$ at 25° C. and atmospheric pressure is about 1.8 kg/m$^3$. The density of $CO_2$ in the tank 9 is about 730 kg/m$^3$. The ratio between the density of the working fluid when contained in the tank 9 under the indicated conditions and the density of the same working fluid when contained in the casing 5 under atmospheric conditions is therefore about 400. It should be noted in this regard that if instead of $CO_2$ the atmospheric air stored at 65 bar and 24° C. in the tank 9 were used, its density would be only 78 kg/m$^3$ and the volume of the tank 9 theoretically required would be about ten times greater.

For example, for a plant 1 according to the invention able to store 100 MWh of energy, the volume of the pressure-balloon is about 400000 m$^3$ while the volume of the tank is about 1000 m$^3$.

Figure 2:
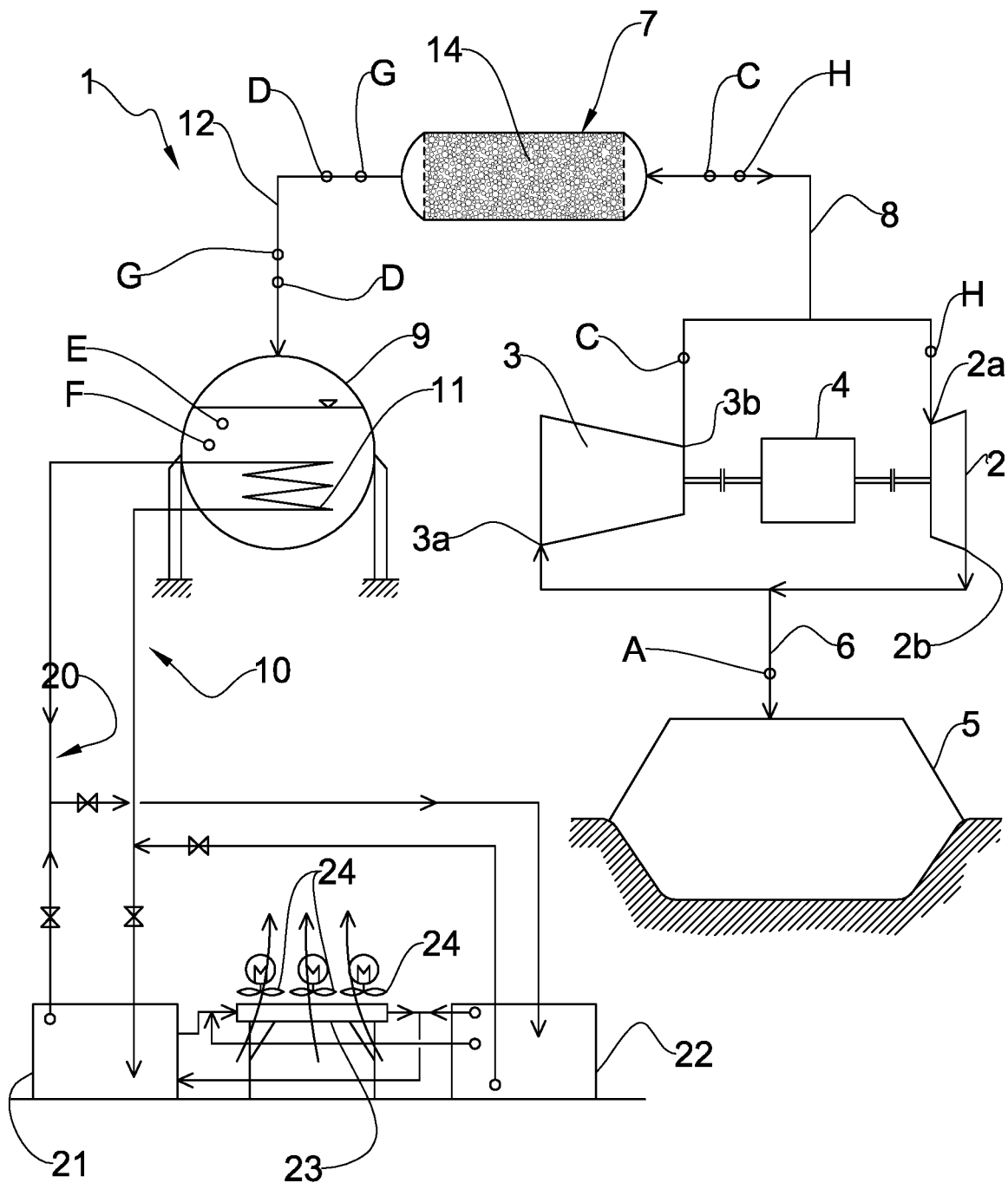
FIG. 2 shows a variant of the plant of FIG. 1.

The variant of FIG. 2 shows a type of primary heat exchanger 7, i.e. a fixed bed heat regenerator comprising a thermal mass 14 consisting, for example, of metal balls. In the charge configuration/phase, the thermal mass 14 is lapped by the hot, compressed working fluid, which transfers heat to the metal balls that store thermal energy. In the discharge configuration/phase, the thermal mass 14 is lapped by the cold working fluid, which absorbs heat from the metal balls and heats up. In a variant not shown, the heat regenerator may also be of the moving bed type. The primary heat exchanger 7 is therefore a thermal storage (Thermal Energy Storage TES).

Instead of the fixed bed heat regenerator shown in FIG. 2, other types of heat regenerator may be used.

Figure 11:
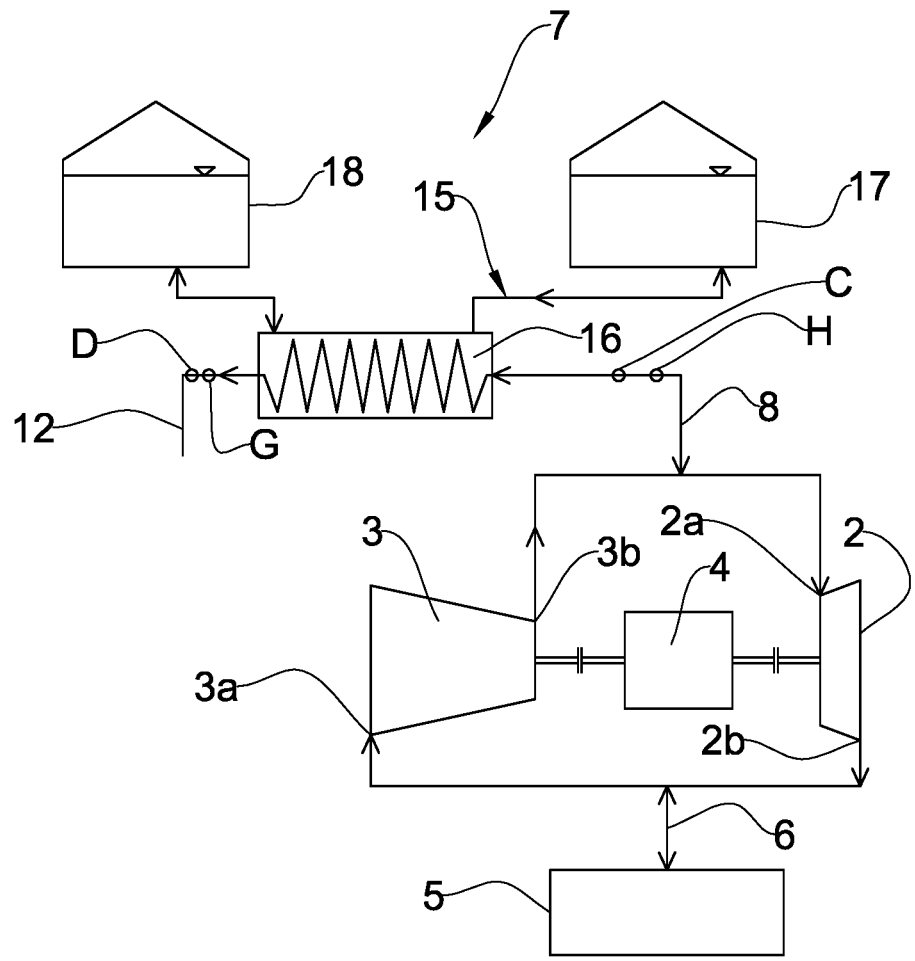
FIGS. 11 and 12 show respective variants of a different portion of the plants in FIGS. 1, 2, 4 and 5.

For example, a possible primary heat exchanger 7 is shown in FIG. 11. As shown in FIG. 11, the primary heat exchanger 7 comprises a primary circuit 15 crossed by a primary fluid, such as water, oil or salts. The primary circuit 15 comprises a heat exchange portion 16 configured to exchange heat with the working fluid. For example, in the schematic embodiment illustrated above, a section of the second 8 pipelines through which the working fluid flows passes through the heat exchange section 16, so that the primary fluid touches said section. The primary circuit 15 comprises a hot primary storage chamber 17, for the hot primary fluid accumulated after removing heat from the working fluid in the charge configuration/phase of the apparatus/process, and a cold primary storage chamber 18, for the cold primary fluid accumulated after transferring heat to the working fluid in the discharge configuration/phase of the apparatus/process. The heat exchange portion 16 is placed between the hot primary storage chamber 17 and the primary cold storage chamber 18. In the charge configuration/phase of the apparatus/process, the primary fluid flows from the cold primary storage chamber 18 to the hot primary storage chamber 17, removing heat from the working fluid. In the discharge configuration/phase of the apparatus/process, the primary fluid flows from the hot primary storage chamber 17 to the cold primary storage chamber 18 releasing heat from the working fluid.

Figure 12:
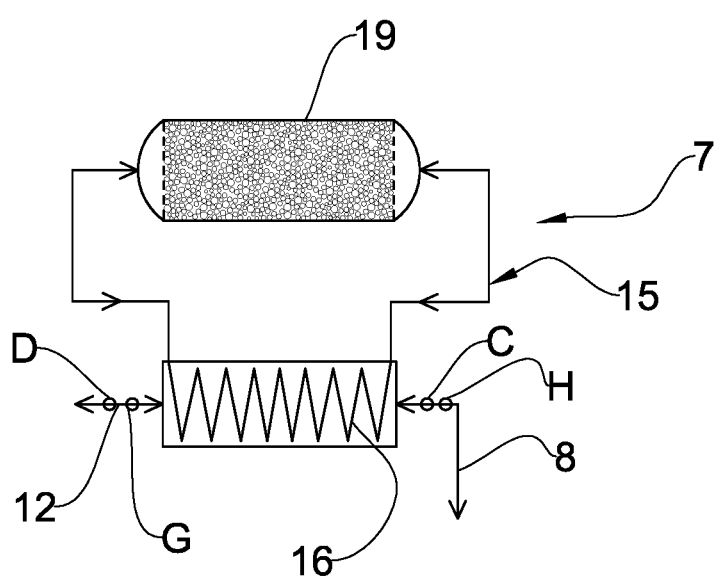

A different possible primary heat exchanger 7 is shown in FIG. 12. According to what is illustrated in FIG. 12, the primary circuit 15 of the primary heat exchanger 7 comprises a heat exchange portion 16 defined by a section of primary circuit 15 that is lapped by the working fluid that passes through the second pipelines 8. The primary circuit 15 also comprises a fixed bed heat regenerator 19, preferably operating at atmospheric pressure and preferably similar to that described above, which is lapped by the primary fluid.

The variant of FIG. 2 is not equipped with the additional heat exchanger 13 so that the corresponding T-S diagram, not illustrated, does not show, with respect to the diagram of FIG. 3, points B and J.

The variant in FIG. 2 also has a special structure of the secondary heat exchanger 10. The secondary heat exchanger 10 shown includes a secondary circuit 20 crossed by a secondary fluid, such as air or water. The secondary circuit 20, in addition to the heat exchange portion 11 housed inside the tank 9, comprises a secondary hot storage chamber 21, for the secondary hot fluid accumulated after removing heat from the working fluid in the charge configuration/phase of the apparatus/process, and a secondary cold storage chamber 22, for the secondary cold fluid accumulated after releasing heat to the working fluid in the discharge configuration/phase of the apparatus/process. The above mentioned chambers 21, 22 are also connected to each other, in addition to the above mentioned heat exchange portion 11, through a radiator 23 equipped with fans 24 and with recirculation ducts that cools the secondary fluid during the night and heats it during the day.

Figure 8:
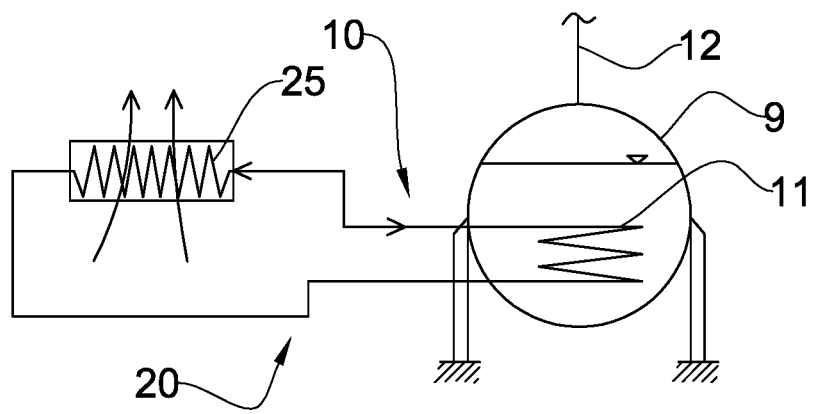
FIGS. 8, 9 and 10 show respective variants of a portion of the plant of FIG. 2.
Figure 9:
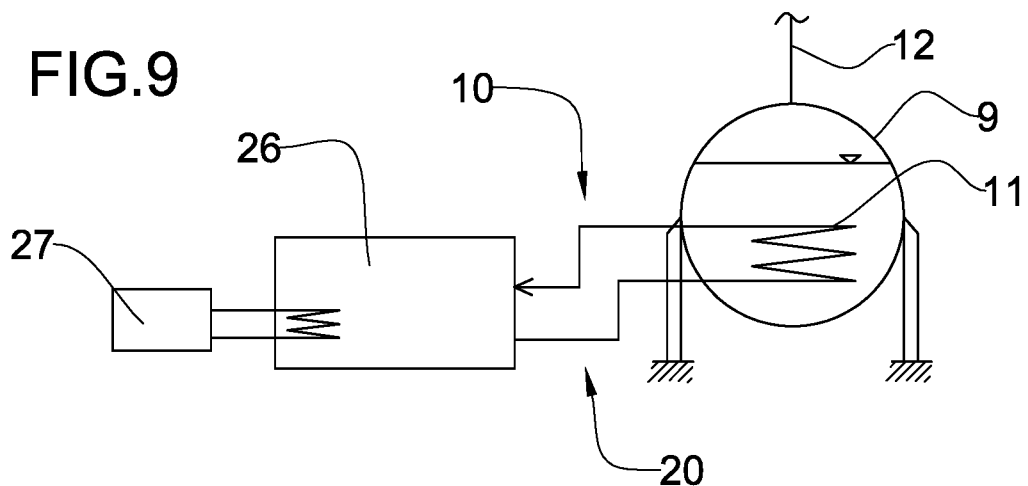
Figure 10:
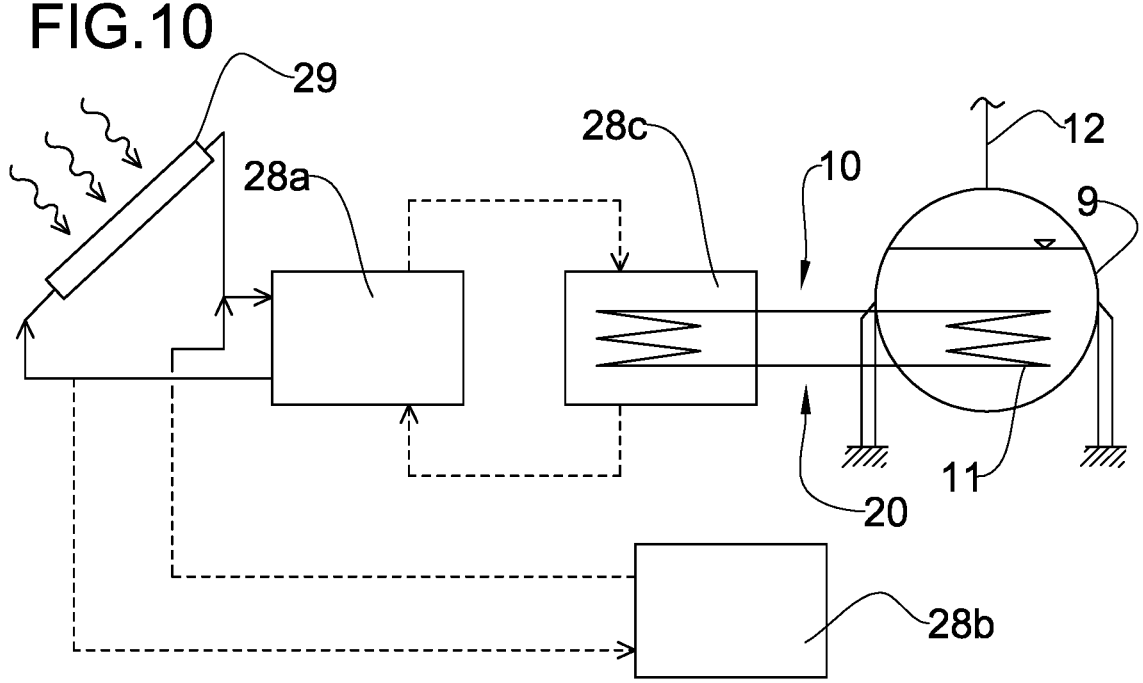

FIGS. 8, 9 and 10 show other variants of the secondary heat exchanger 10 associated with tank 9.

In FIG. 8, the secondary circuit 20, in addition to the heat exchange portion 11, is equipped with an additional heat exchange portion 25 through which it exchanges heat with e.g. air or sea water.

In FIG. 9, the secondary circuit 20 is equipped with a secondary tank 26 with water/ice or another two-phase system operationally connected to an auxiliary chiller 27.

In FIG. 10, the secondary circuit 20 is located in a basin full of water consisting of several chambers 28a, 28b, 28c. The embodiment illustrated in FIG. 10 shows a chamber 28a for hot water storage, a chamber 28b for cold water storage and a chamber 28c in fluid communication with the others and housing part of the secondary circuit 20. The secondary fluid in the secondary circuit 20 is cooled or heated by the water in the basin. The working fluid is condensed in the charge phase and evaporated in the discharge phase by the suitably circulated water, preferably through immersion pumps and through the secondary fluid. The chambers 28 of said basin can be covered or uncovered and in communication or not with the environment so that the chamber from which the water is circulated for condensation during charging is always cooled by the surrounding environment, by appropriate panels 29, while the one from which the water is circulated for evaporation during discharging is always heated by the surrounding environment and possibly kept warm by a cover. The above can be further supported by special exchange systems that absorb heat or release heat, both through convection and radiation, with the environment, all in order to improve the RTE of the system.

Figure 4:
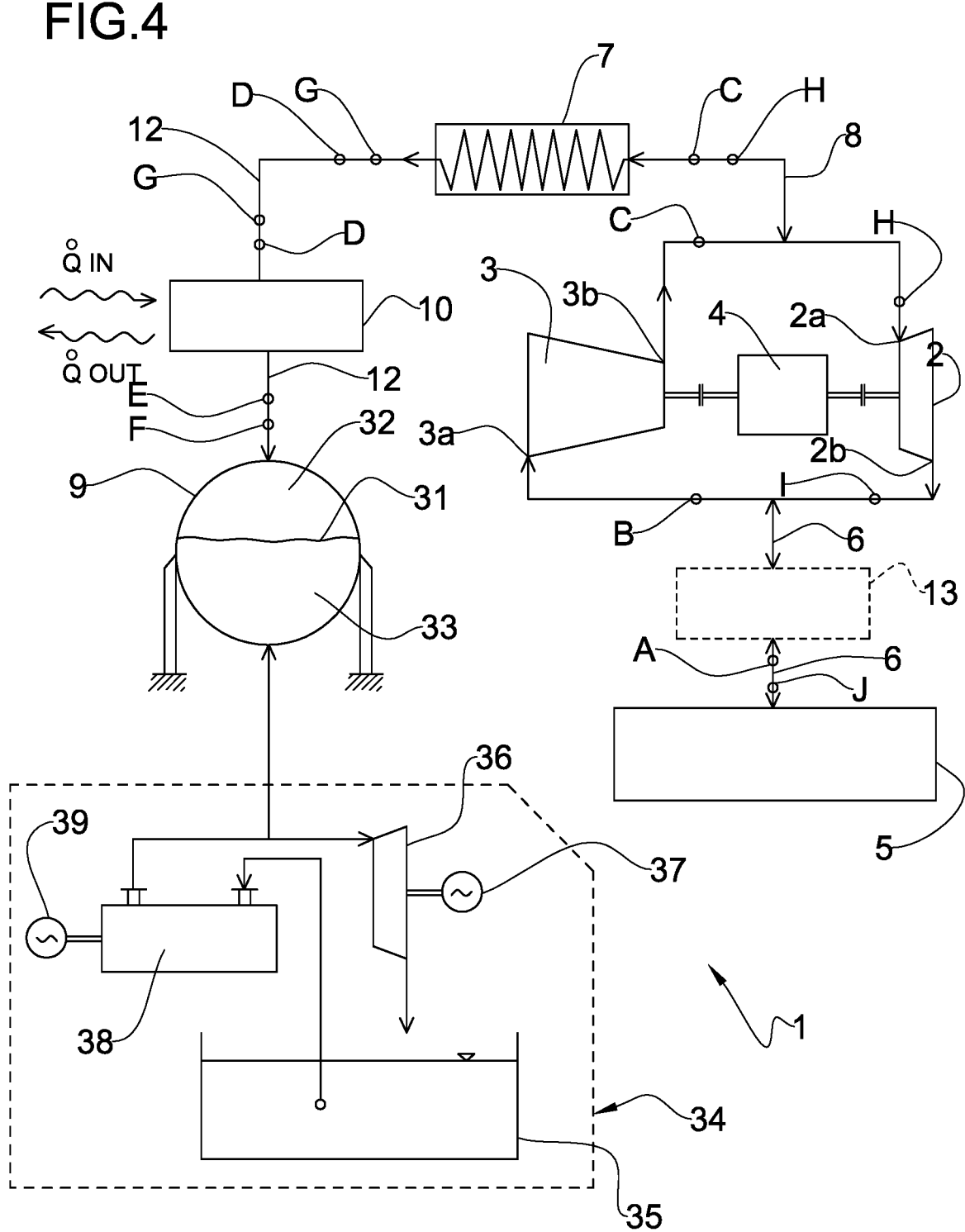
FIG. 4 shows a further embodiment of an energy storage plant according to the present invention.
Figure 5:
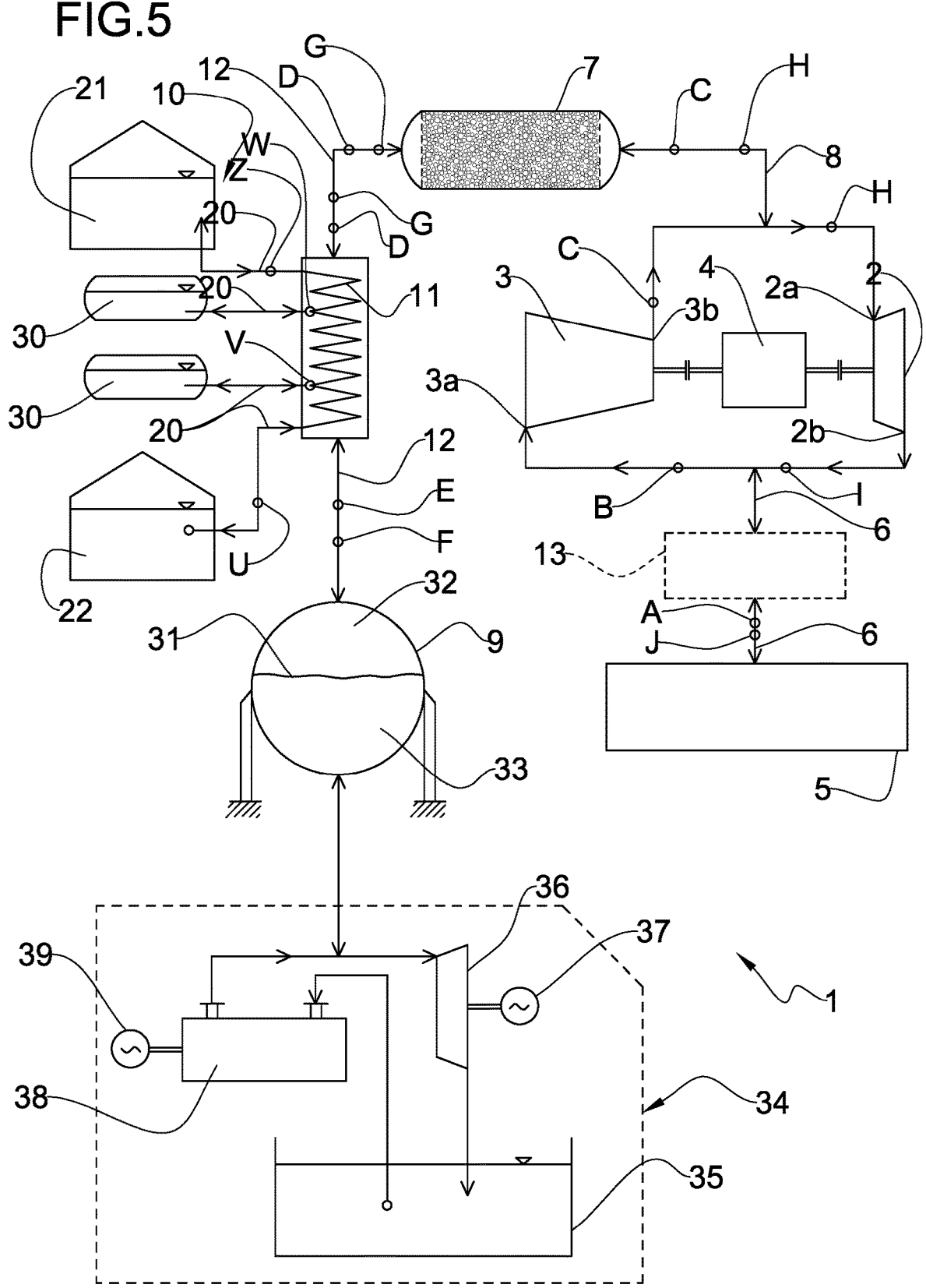
FIG. 5 shows a variant of the plant of FIG. 4.

The embodiments of FIGS. 4 and 5 differ structurally from what has already been described because the secondary heat exchanger 10 is placed between the primary heat exchanger 7 and the tank 9, i.e. it is not integrated in the tank 9. The secondary heat exchanger 10 is in line on the third pipelines 12. FIG. 4 schematically illustrates a generic secondary heat exchanger 10. FIG. 5 shows a schematic design example of the secondary heat exchanger 10.

The secondary heat exchanger 10 shown in FIG. 5 comprises a secondary circuit crossed by a secondary fluid, e.g. water. The secondary circuit 20 has a heat exchange portion 11 that is lapped by the working fluid that passes through the third pipelines 12 and is configured to exchange heat with the working fluid.

The secondary circuit 20 of FIG. 5 comprises a secondary hot storage chamber 21, for the secondary hot fluid accumulated after removing heat from the working fluid in the charge configuration/phase of the apparatus/process, and a secondary cold storage chamber 22, for the secondary cold fluid accumulated after releasing heat to the working fluid in the discharge configuration/phase of the apparatus/process.

The heat exchange portion 11 is located between the secondary hot storage chamber 21 and the secondary cold storage chamber 22. In the charge configuration/phase of the apparatus/process, the secondary fluid flows from the secondary cold storage chamber 22 to the secondary hot storage chamber 21, removing heat from the working fluid. In the discharge configuration/phase of the apparatus/process, the secondary fluid flows from the secondary hot storage chamber 21 to the secondary cold storage chamber 21, releasing heat from the working fluid. The secondary circuit 20 also comprises one or more intermediate secondary storage chambers 30 to adjust/vary the flow rate of the secondary fluid in the heat exchange portion 11 and the temperature variation of the working fluid exchanging heat with this secondary fluid. FIG. 5 shows two intermediate secondary storage chambers 30.

The embodiments of FIGS. 4 and 5 differ structurally from what has already been described also because the tank 9 comprises a separation membrane 31 configured to internally separate the tank 9 in a first chamber with variable volume 32 for the working fluid in super-critical phase and in a second chamber with variable volume 33 in fluid communication with a compensation circuit 34 containing water. The compensation circuit 34 is configured to maintain a substantially constant pressure in the super-critical working fluid coming from the secondary heat exchanger 20 and contained in the first variable volume chamber 32 of the tank 9.

The compensation circuit 34 comprises an auxiliary tank 35 for water at atmospheric pressure, which is in fluid communication, through appropriate pipelines, with a lower portion of the tank 9 and with the second variable volume chamber 33. An auxiliary turbine 36 has an inlet in communication with the second variable volume chamber 33 and an outlet connected to the auxiliary tank 35. The auxiliary turbine 36 is connected to an auxiliary generator 37 and is configured to be rotated by the water coming from the second variable volume chamber 33 in the charge configuration/phase of the apparatus/process. A pump 38 has an inlet in communication with the auxiliary tank 35 and an outlet connected to the second variable volume chamber 33. The pump 38 is connected to an auxiliary motor 39 and is configured to pump water from the auxiliary tank 35 into the second variable volume chamber 33 in the discharge configuration/phase of the apparatus/process.

Figure 6:
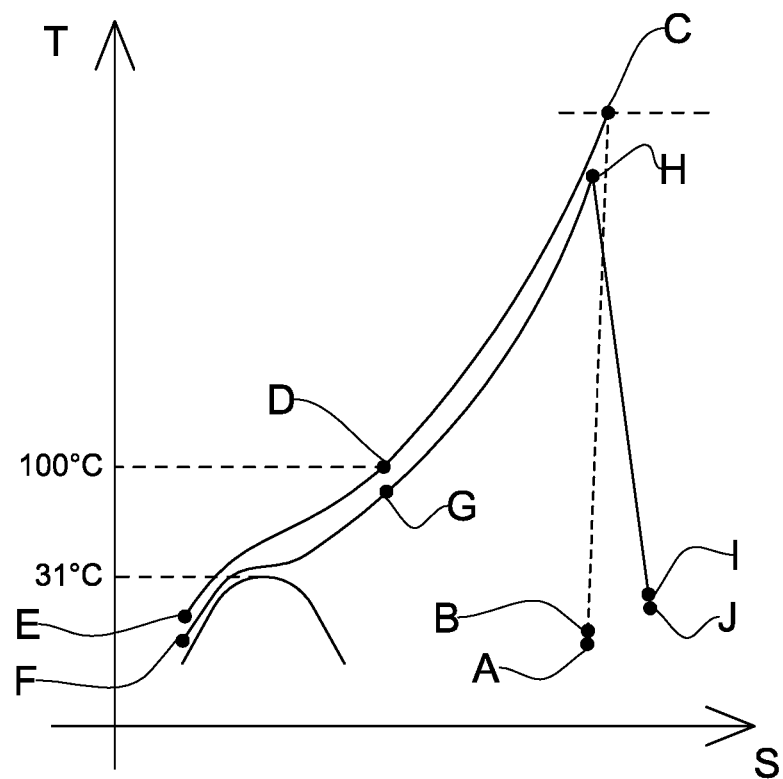
FIG. 6 is a T-S diagram showing a process according to the present invention implemented in the plants of FIG. 4 or 5.

FIG. 6 shows the T-S diagram for the embodiments of FIGS. 4 and 5.

Figure 7:
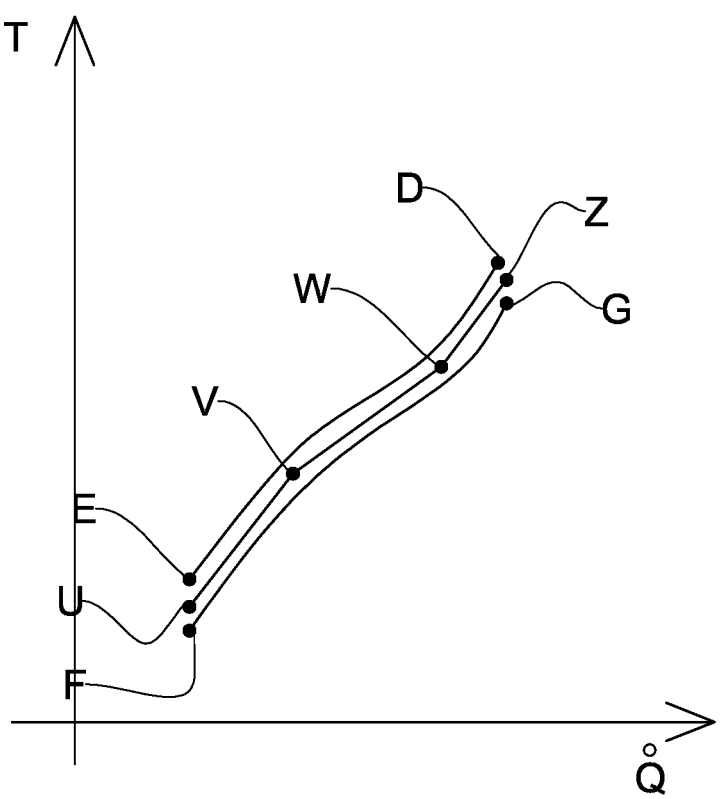
FIG. 7 is a T-Q diagram showing a part of the process according to the present invention implemented in the plants of FIG. 4 or 5.

FIG. 7 shows the T-Q diagram relating to a part of the thermodynamic transformation carried out by the embodiment of FIG. 5.

The secondary heat exchanger 10 and the primary heat exchanger 7 of the embodiments of FIGS. 4 and 5 are configured to operate a super-critical transformation of the working fluid so that said working fluid is accumulated in the tank in super-critical phase. In fact, unlike what is shown in FIG. 3, the primary heat exchanger 7 removes heat from the working fluid up to bring it (point D of FIG. 6) to a temperature higher than the critical temperature and above the Andrews bell.

Subsequently, the secondary heat exchanger 10 brings the working fluid into super-critical phase (point E) making it follow the right side of Andrews' bell. FIG. 7 shows the temperature decrease from point D to point E of the working fluid during the charge phase and the corresponding temperature increase of the secondary working fluid of the secondary heat exchanger 10 of FIG. 5 (points U, V, W, Z).

The same FIG. 7 also illustrates the temperature increase from point F to point G of the working fluid during the discharge phase and the corresponding temperature decrease of the secondary working fluid of the secondary heat exchanger 10 of FIG. 5 (points Z, W, V, U).

For instance, a working fluid temperature ($CO_2$) accumulated in super-critical phase in the tank 9 is 25° C. and a working fluid pressure accumulated in super-critical phase in the tank 9 is 100 bar. The density of $CO_2$ at 25° C. and atmospheric pressure is about 1.8 kg/m$^3$. The density of $CO_2$ in the tank 9 is about 815 kg/m$^3$. The ratio between the density of the working fluid when contained in the tank 9 under the indicated conditions and the density of the same working fluid when contained in the casing 5 under atmospheric conditions is therefore about 450.

It should be noted that the structure of the secondary heat exchanger of FIG. 10 may also be adopted in the embodiment of FIGS. 4 and 5.

In addition, the secondary heat exchanger may be equipped with flow rate and/or temperature control systems for secondary fluid, typically water or air, capable of regulating the pressure in the storage tanks within certain limits, when the system operates in sub-critical conditions. Temperature control may, for example, be carried out by adding heat from the atmosphere or removing heat to atmosphere, also taking advantage of the normal fluctuations in the ambient temperature of air and water at different times of the day.

In the illustrated embodiments using $CO_2$ as the working fluid, a $CO_2$ dehydration system, a de-humidifier, for example with zeolites, is also preferably present to avoid potential formation of carbonic acid in the circuit.

Figure 13:
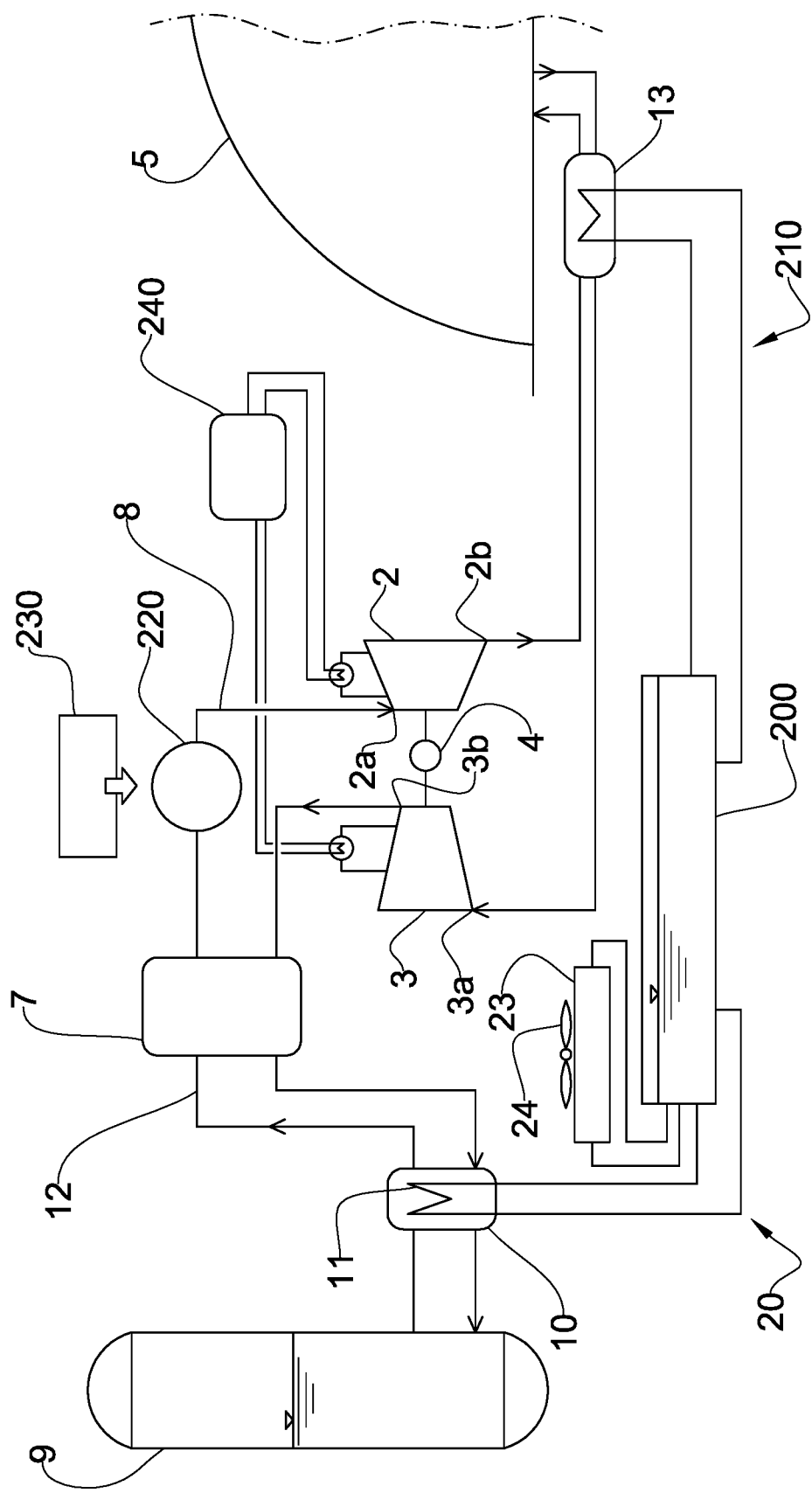
FIG. 13 shows a further embodiment of an energy storage plant according to the present invention.

FIG. 13 shows a further variant of plant 1. It shows the main elements common to FIG. 1, i.e. the turbine 2, the compressor 3, the motor generator 4, the casing 5, the primary heat exchanger 7 (TES thermal storage), the tank 9 and the secondary heat exchanger 10. Plant 1 shown here also comprises the additional heat exchanger 13. As in the embodiment shown in FIG. 4, the secondary heat exchanger 10 is located between the primary heat exchanger 7 and the tank 9, i.e. it is not integrated in tank 9. Similar to the plant shown in FIG. 2, the secondary heat exchanger 10 comprises a secondary circuit 20 crossed by a secondary fluid, e.g. water. The secondary circuit 20, in addition to the heat exchange portion 11 comprises a secondary storage chamber 200, for the secondary hot fluid accumulated after removing heat from the working fluid in the charge configuration/phase of the apparatus/process and for the secondary cold fluid accumulated after releasing heat to the working fluid in the discharge configuration/phase of the apparatus/process. The above mentioned secondary storage chamber 200 is also combined with a radiator 23 equipped with one or more fans 24 placed on a recirculation duct which, for example, cools the secondary fluid during the night and heats it during the day. The above-mentioned secondary storage chamber 200 is also connected to the additional heat exchanger 13 via a corresponding circuit 210.

In this embodiment, plant 1 also comprises at least one additional heat exchanger 220 which receives heat from an additional heat source 230. The additional heat exchanger 220 is located on the second pipeline 8, between the inlet 2a of turbine 2 and the primary heat exchanger 7. The additional heat source 230 is, for example but not exclusively, a solar source (e.g. solar field), residual heat deriving from industrial recovery (Waste Heat Recovery), exhaust heat from gas turbines, etc.

The additional heat source 230 provides additional heat during the discharge phase.

The temperature at which the working fluid is brought during the discharge phase and just before it enters turbine 2, via the additional heat source 230 and the additional heat exchanger 220, is higher than the temperature of the working fluid that is obtained at the end of the compression during the charge phase. For example, the temperature at which the working fluid is brought by the additional heat source 230 and the additional heat exchanger 220 is about 100° C. but also 200° C. or 300° C. or 400° C. higher than the temperature of the working fluid at the end of compression.

Plant 1 is also equipped with an auxiliary thermal storage 240 (Thermal Energy Storage TES) connected, through appropriate circuits, to the compressor 2 and the turbine 2 in order to achieve, in the compressor 3 (during the charge phase), an inter-cooled compression (with one or more inter-coolings) and to achieve, in the turbine 2 (during the discharge phase), an inter-heated expansion (with one or more inter-heatings). The heat accumulated in the auxiliary heat accumulator 240 during the inter-cooled compression is used in whole or in part to achieve the inter-heated expansion.

In an embodiment of the process performed with the plant of FIG. 13, it is provided not to carry out inter-coolings in the charge phase and not to carry out inter-heatings in the discharge phase and to provide additional heat in the discharge phase through the additional heat source 230 and the additional heat exchanger 220.

In variants of the process performed with the plant of FIG. 13, it is provided to make one or more inter-coolings in the charge phase and an equal number of inter-heatings in the discharge phase, in addition to providing additional heat in the discharge phase through the additional heat source 230 and the additional heat exchanger 220.

In a further embodiment of the process performed with the plant of FIG. 13, it is provided to carry out a number of inter-coolings in the charge phase and to carry out a single inter-cooling in the discharge phase using the heat (accumulated in the auxiliary thermal accumulator 240) only of the last inter-cooling, in addition to heat with the additional heat through the additional heat source 230 and the additional heat exchanger 220. The heat stored in the auxiliary heat storage 240 and coming from the remaining inter-coolings can be used for other purposes, e.g. for co-generation.

LIST OF ELEMENTS 1 energy storage plant
2 turbine
2a turbine inlet
2b turbine outlet
3 compressor
3a compressor inlet
3b compressor outlet
4 motor-generator
5 casing
6 first pipelines
7 primary heat exchanger
8 second pipelines 9 tank
10 secondary heat exchanger
11 heat exchange portion of secondary heat exchanger
12 third pipelines
13 additional heat exchanger
13a cooler
14 thermal mass
15 primary circuit
16 heat exchange portion of the primary circuit
17 primary hot storage chamber
18 primary cold storage chamber
19 fixed bed heat regenerator
20 secondary circuit
21 secondary hot storage chamber
22 secondary cold storage chamber
23 radiator
24 fans
25 further heat exchange portion
26 secondary tank
27 auxiliary chiller
28a, 28b, 28c water basin chambers
29 panels
30 intermediate secondary storage chambers
31 separation membrane
32 first variable volume chamber
33 second variable volume chamber
34 compensation circuit
35 auxiliary tank
36 auxiliary turbine
37 auxiliary generator
38 pump
39 auxiliary motor
200 secondary storage chamber
210 additional heat exchanger circuit
220 additional heat exchanger
230 additional heat source
240 auxiliary thermal storage

The invention claimed is:

1. An energy storage plant, comprising:
a casing configured to store a working fluid other than atmospheric air in a gaseous phase;
a tank configured to store said working fluid in a liquid phase;
a compressor;
a turbine; and
heat exchangers configured to store thermal energy from the working fluid or to release thermal energy to the working fluid,
wherein the casing is selectively in fluid communication with an inlet of the compressor or with an outlet of the turbine;
wherein the heat exchangers are selectively in fluid communication with an outlet of the compressor or with an inlet of the turbine;
wherein the tank is in fluid communication with the heat exchangers;
wherein the plant is configured to perform a closed cyclic thermodynamic transformation, first in one direction in a charge configuration and then in an opposite direction in a discharge configuration, between said casing and said tank;
wherein in the charge configuration the plant stores heat and pressure and in the discharge configuration generates energy;
wherein the heat exchangers are configured to operate a sub-critical transformation of the working fluid;
wherein the plant is configured to make the tank work at a constant pressure or substantial constant pressure and to make the casing work at a constant pressure or substantial constant pressure;
wherein in the charge configuration the working fluid is accumulated in the tank in the liquid phase with a temperature close to a critical temperature and said critical temperature is close to the ambient temperature;
wherein in the discharge configuration the working fluid is evaporated, expanded, and stored in the casing;
wherein the casing is a pressure-balloon or has the structure of a gasometer so that the working fluid in said casing is in equilibrium of pressure with the atmosphere, with low or no overpressure, in any operating condition,
wherein the heat exchangers comprise a primary heat exchanger and a secondary heat exchanger, the secondary heat exchanger being located between the primary heat exchanger and the tank or being integrated into the tank; and
wherein, in the discharge configuration, the working fluid is heated through the heat stored by the primary heat exchanger and secondary heat exchanger.

2. The plant of claim 1, wherein the secondary heat exchanger is configured to regulate the pressure in the tank in the charge configuration and in the discharge configuration through a direct or indirect heat exchange with the atmosphere.

3. The plant of claim 1,
wherein the primary heat exchanger is a thermal energy storage or is operatively coupled to a thermal energy storage; and
wherein the thermal energy storage is configured to store thermal energy released by the working fluid in the charge configuration and to provide thermal energy to the working fluid in the discharge configuration.

4. The plant of claim 1,
wherein the secondary heat exchanger comprises a secondary circuit crossed by a secondary fluid;
wherein the secondary circuit includes a heat exchange portion lapped by the working fluid, a secondary hot storage chamber, for the secondary fluid accumulated after removing heat from the working fluid in the charge configuration, and a secondary cold storage chamber, for the secondary fluid accumulated after releasing heat to the working fluid in the discharge configuration; and
wherein the secondary hot storage chamber and the secondary cold storage chamber are connected to each other through a radiator equipped with fans and with recirculation ducts that cool the secondary fluid during night and heats it during day.

5. The plant of claim 1,
wherein the secondary heat exchanger comprises a secondary circuit crossed by a secondary fluid;
wherein the secondary circuit includes a heat exchange portion lapped by the working fluid and an additional heat exchange portion; and
wherein the additional heat exchange portion is configured to exchange heat with air or sea water.

6. The plant of claim 1,
wherein the secondary heat exchanger comprises a secondary circuit crossed by a secondary fluid; and
wherein the secondary circuit includes a heat exchange portion lapped by the working fluid and a secondary tank with a two-phase system operationally connected to an auxiliary chiller.

7. The plant of claim 1,
wherein the secondary heat exchanger comprises a secondary circuit crossed by a secondary fluid;
wherein the secondary circuit includes a heat exchange portion lapped by the working fluid;
wherein the secondary circuit is located in a basin full of water consisting of several chambers; and
wherein the secondary fluid in the secondary circuit is cooled or heated by the water in the basin.

8. The plant of claim 1,
wherein the secondary heat exchanger comprises a secondary circuit crossed by a secondary fluid;
wherein the secondary circuit includes a heat exchange portion lapped by the working fluid and a secondary storage chamber, for the secondary fluid accumulated after removing heat from the working fluid in the charge configuration and for the secondary fluid accumulated after releasing heat to the working fluid in the discharge configuration; and
wherein the secondary storage chamber is combined with a radiator equipped with one or more fans placed on a recirculation duct which cools the secondary fluid during night and heats it during day.

\* \* \* \* \*